Oct. 6, 1959     D. ISSAIEWITCH REBIKOFF     2,907,162
SUBMARINE CLEARING MACHINE
Filed July 10, 1957     2 Sheets-Sheet 2
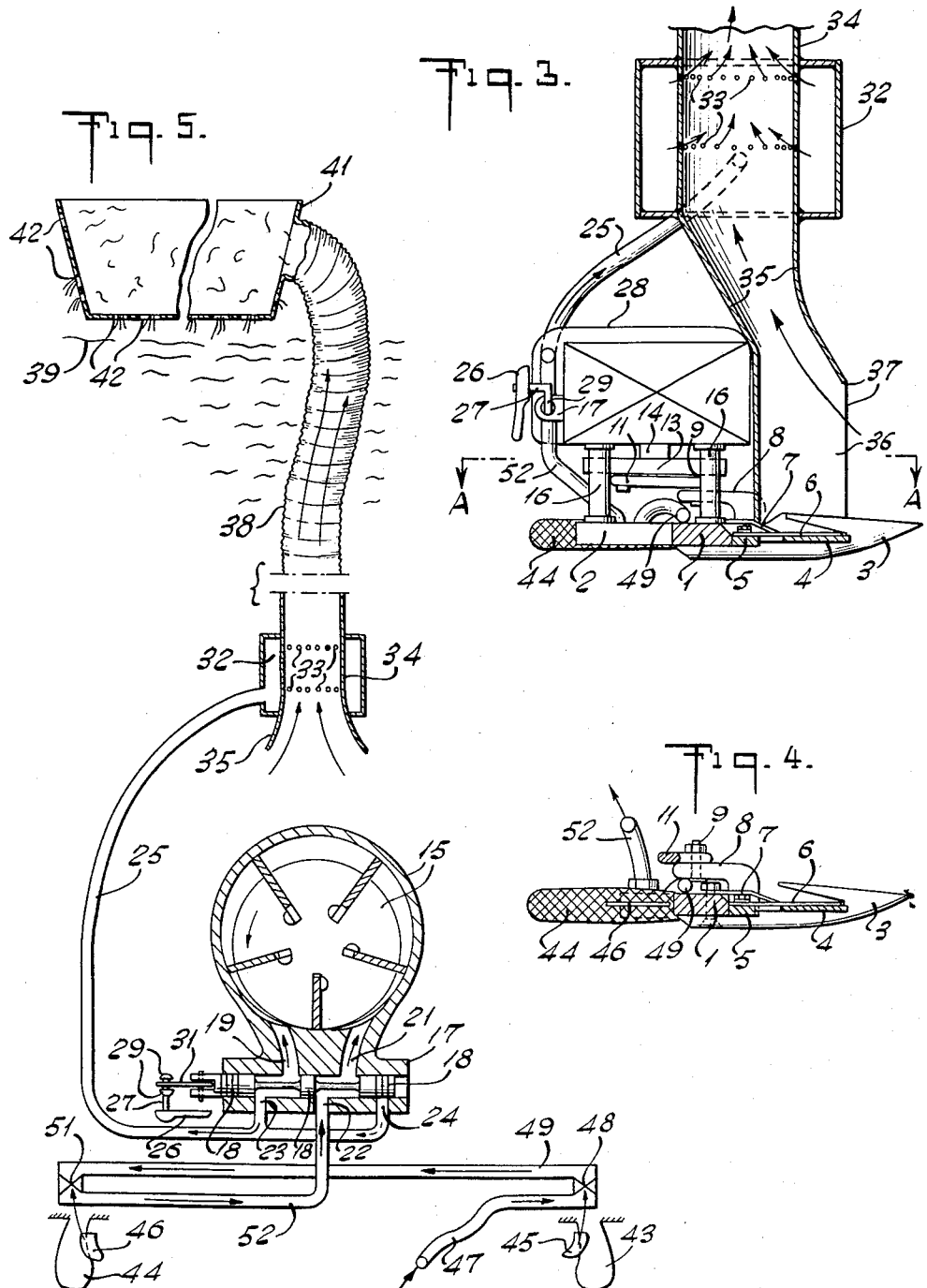
INVENTOR
DIMITRI ISSAIEWITCH REBIKOFF
BY Stanley Welv
ATTORNEY

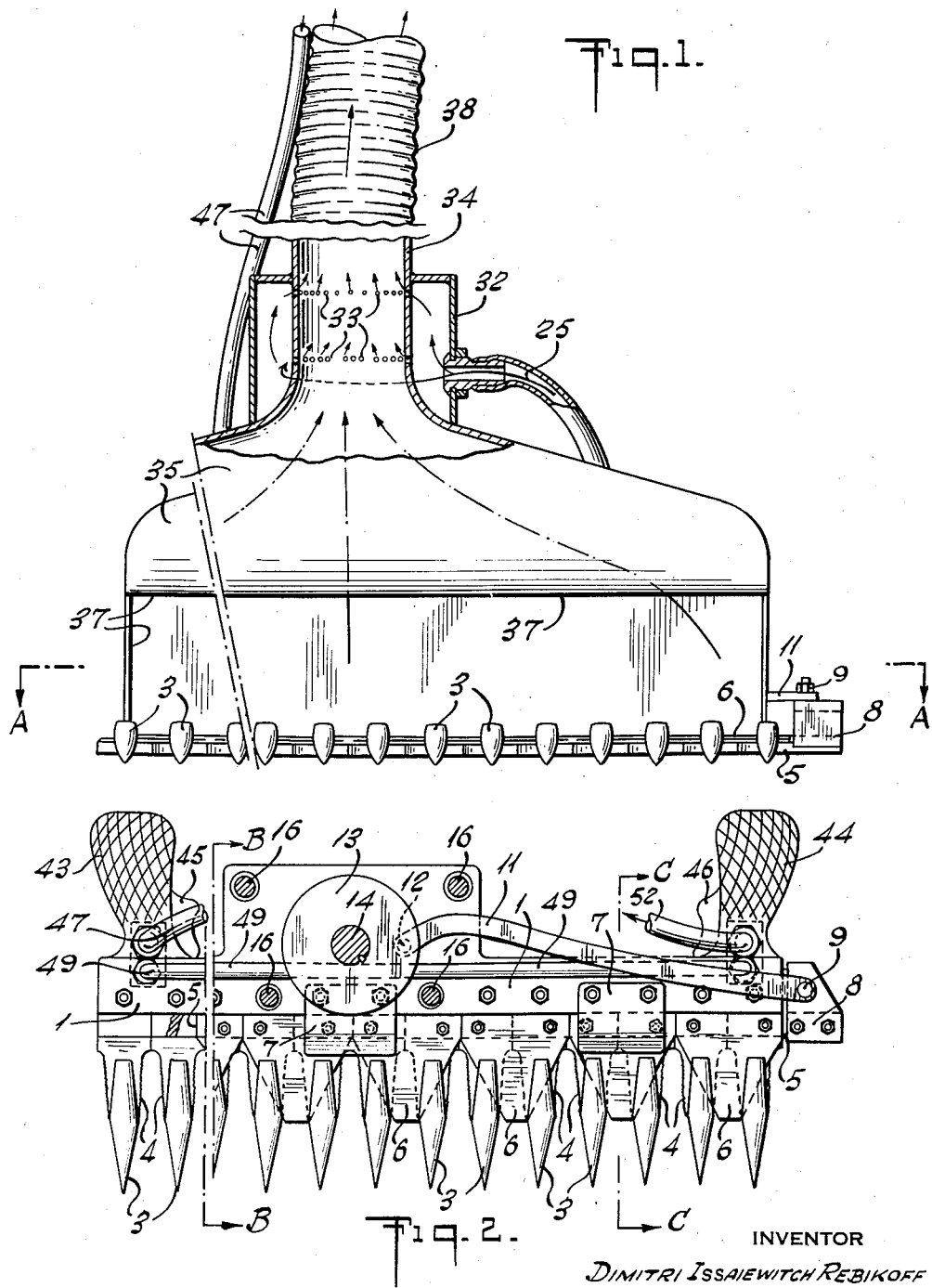

United States Patent Office 2,907,162
Patented Oct. 6, 1959

2,907,162

SUBMARINE CLEARING MACHINE

Dimitri Issaiewitch Rebikoff, Cannes, France

Application July 10, 1957, Serial No. 671,030

5 Claims. (Cl. 56—9)

The clearing out of weeds and seaweeds has led to the use of scythes or mowing machines the operative section of which is constituted by cutting bars of the type used for agricultural purposes and controlled by an electric motor for instance.

These machines work in an excellent manner, but there remains the problem of collecting the cut weeds, chiefly when the latter do not rise automatically to the surface.

The object of my invention is to remove this drawback by ensuring the automatic guided rising movement of the cut weeds without any further expenditure of energy.

The arrangement according to my invention consists in a submarine mowing or clearing machine controlled by a compressed air engine driving conventional cutting means. According to my invention, the air exhausted out of the engine serves for the emulsification of the water and its rising into at least one emulsifier secured to said clearing machine and the suction into which is exerted above and in the vicinity of the cutting members so that the cut material may be sucked in and raised automatically above the level of the water in admixture with the emulsified water and that they may be collected after the water has been drained off.

In an auxiliary manner, the admission of compressed air into the engine may be controlled by two valve systems inserted in series in the feed channel, each arrangement being actuated positively through the operator who grasps one of the handles secured to the clearing machine for ensuring its movement. Thus, the operator is automatically prevented from engaging his hand into the cutting section of the operative mowing or clearing machine. The admission and the exhaust of the driving air are controlled by reversing means of a known type which are manually actuated by the operator who may thus reverse the direction of operation so as to release the cutters if required.

My invention will be better understood after the reading of the following description, reference being made to the accompanying drawings illustrating diagrammatically and by no means in a limiting sense an embodiment of said invention. In said drawings:

Fig. 1 is a front fragmentary view of the machine with parts broken away and parts shown in section.

Fig. 2 is a partial plan view of the lower section of the mowing or clearing machine the parts of which above the sectional plane A—A of Fig. 3 have been removed, with parts shown in section.

Fig. 3 is a longitudinal elevational sectional view through line B—B of Fig. 2.

Fig. 4 is a partial longitudinal sectional view through line C—C of Fig. 2.

Fig. 5 illustrates diagrammatically the system of channels feeding the compressed air in association with the control members, the compressed air engine and the emulsifier, with parts shown in section.

In said figures, the same reference numbers designate same parts.

The clearing machine includes a stationary transverse base or plate 1 including a rearward extension forming a platform 2, said plate carrying the stationary teeth 3 provided with cutting sections 4.

Adjacent the stationary plate is arranged a cutting bar 5 which rests on the teeth 3 forming a guide for them, said cutting bar carrying the movable cutters 6 and being held in position by the spring blade 7, said bar 5 being adaped to move along the lateral surface of the plate 1. This system is similar to the so-called Danish bar used on mowing machines for agricultural purposes.

The cutting bar 5 is constrained to reciprocate through the agency of a bent member 8 secured endwise to the bar and extending above the plate 1 and the bolts assembling said plate with the teeth 3 for instance. This bent member 8 carries a vertical spindle 9 which is connected through the connecting rod 11 with the crank 12 on the crank plate 13 keyed to the end of the shaft 14 of the compressed air engine 15 which is secured by the stays 16 at a suitable height above the platform 2.

This engine 15 of any suitable known type, of the bladed type for instance, is provided in the case illustrated with a slide valve 17 (Fig. 3) and a multiple piston 18 adapted when shifted to reverse the admission of compressed air into the ports 19 and 21 (Fig. 5) of the engine, said compressed air being fed at 22 into the slide valve while the exhaust of the compressed air is provided selectively according to the case through the ports 23 and 24, in the slide valve, which latter ports open into the exhaust pipes 25. The shifting of the slide valve piston controlling the reversal of the engine is controlled for instance by a handle 26 the spindle 27 of which extends through the wall of a casing 28 surrounding the engine 15 and the slide valve 17. Said handle controls a lever 29 connected through a connecting rod 31 with the actual slide valve piston 18. According to a main feature of my invention, the air exhausted at 25 after driving the engine 15 for the clearing of the seaweeds or the like through the reciprocation of the cutting bar 5, enters the expansion chamber 32 surrounding the perforated section 33 of the tube 34 of the emulsifier. The latter includes an extension at its lower end, said extension being constituted by a metal sheet flaring downwardly to form a suction funnel 35 which is secured for instance to the casing 28 surrounding the engine 15 and the slide valve 17 while its side walls 36 are secured to the stationary plate 1 of the machine.

Said funnel 35 is provided throughout the length of the cutting bar with an opening 37 through which the water sucked into the emulsifier, draws upwardly the cut weeds which are admixed with the water and the emulsifying air into registry with the perforations 33 providing for the suction of air. The cut weeds are thus constrained to rise with the emulsified water inside a yielding tube as shown at 38 in Fig. 1, said yielding tube opening slightly above the level 39 of the water into a perforated container 41 or a container having a sieve in its bottom, said container being open to atmosphere through its upper end. The weeds separated from the water remain at the bottom of the container while the water flows out through the openings 42 in the bottom of the container. The crew of the ship carrying the container 41 may readily remove and collect the weeds which have been cut and raised, as soon as they reach said container.

For shifting the arrangement over water, there is provided for the safety of the diver or the like operator projecting triggers 45 and 46 carried by the handle-forming terminal sections 43 and 44 of the transverse plate 1.

As shown in the diagrammatic Fig. 5, the compressed air is fed from above the surface of the water through the pipe 47 into a valve casing, shown diagrammatically at 48, controlled by the trigger 45 which opens the valve in the pipe 47 when the diver grasps in his hand the handle 43 for shifting and guiding the clearing machine.

As it passes out of the valve casing 48, the compressed air passes through the pipe 49 into a further valve casing 51 which is similar to the casing 45, the air passing through said casing 51 when the trigger 46 on the second guiding handle 44 is actuated.

The air which has passed in series through the two valve casings 49 and 51 when the two triggers 45 and 46 are simultaneously actuated may then reach through the pipe 42 the port 22 of the slide valve 17 so that the engine starts rotating in a direction defined by the position given to the handle 26.

It is therefore necessary for the diver to hold both hands on the corresponding handles and thereby guide the machine during operation, so that the engine may be set operating. On the other hand, the operation of the speed reversing means through the handle 26 can be obtained only when the engine is stopped.

This speed reversal may also be obtained within the scope of the invention, as defined in the accompanying claims through the agency of a trigger or lever actuated by the hand engaging one of the handles 43 or 44 so as to retain the safety of operation as provided by the necessity of the hands remaining outside the operative cutting area in accordance with known practice applied in other machines.

Of course, the compressed air engine may be of any type and include a plurality of driving units of a rotary or piston type engaging directly or through the agency of a crankshaft the cutting bar so as to impart to the latter a reciprocatory movement.

It is essential in accordance with my invention for the air exhausted out of the engine or engines to feed the diffuser of the emulsifier which is to raise the cut weeds admixed with the liquid which is being emulsified.

What I claim is:

1. A plant clearing machine for underwater use comprising a base, plant cutting means mounted to said base and extending forwardly therefrom, a compressed-air motor mounted to said base and mechanically connected to said cutting means to drive the same, an enclosed emulsion chamber mounted to said base, air conduit means connecting the air exhaust of said motor and said chamber, funnelled collector means connected at one end to said chamber, the other end thereof positioned proximate said cutting means and a flexible tube connected at one end to and in communication with an upper portion of said chamber.

2. A plant clearing machine as described in claim 1 and a tube having perforations in the walls thereof extending through said chamber connecting said funnelled collector means and said flexible tube.

3. A plant clearing machine for use under a body of water comprising a base, plant cutting means mounted to said base and extending forwardly therefrom, a compressed-air motor mounted to said base and mechanically connected to said cutting means to drive the same, an enclosed emulsion chamber mounted to said base, air conduit means connecting the air exhaust of said motor and said chamber, funnelled collector means connected at one end to said chamber, the other end thereof positioned proximate said cutting means and a flexible tube connected at one end to and in communication with an upper portion of said chamber, the other end of said tube extending above the water level of said body of water and strainer means connected to said tube and positioned at said other end to collect and strain the material emitted from said tube.

4. A plant clearing machine for underwater use comprising a stationary platform, plant cutting means mounted to and extending forwardly of said platform, a compressed-air motor mounted to said platform and mechanically connected to said cutting means to drive the same, compressed-air supply means connected to said motor and an enclosed emulsion chamber mounted to said platform, air conduit means connecting the air exhaust of said motor and said chamber, funnelled collector means connected at one end to said chamber, the other end thereof being positioned proximate said cutting means, a flexible exhaust tube connected at one end to and in communication with an upper portion of said chamber, a tube having perforations in the walls thereof and of smaller dimensions than said chamber extending through said chamber connecting said funnelled collector means and said flexible exhaust tube, the free end of said exhaust tube being dimensioned to extend above the water level, and strainer means positioned at said free end to collect and strain the material emitted therefrom.

5. A plant clearing machine as described in claim 4, an opposed pair of handles affixed to said platform and extending rearwardly therefrom, an air switch connected to each of said handles, said air switches being located in series with said compressed air supply means.

References Cited in the file of this patent

UNITED STATES PATENTS

| | | |
|---|---|---|
| 1,571,395 | Clark | Feb. 2, 1926 |
| 2,181,863 | Bell | Dec. 5, 1939 |
| 2,204,584 | Flower | June 18, 1940 |
| 2,629,218 | Smith | Feb. 24, 1953 |